United States Patent
Bu et al.

(10) Patent No.: US 9,494,731 B2
(45) Date of Patent: Nov. 15, 2016

(54) LIGHT BAR, BACKLIGHT AND DISPLAY DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventors: Zhanchang Bu, Beijing (CN); Kun Lu, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 23 days.

(21) Appl. No.: 14/549,008

(22) Filed: Nov. 20, 2014

(65) Prior Publication Data

US 2015/0338570 A1    Nov. 26, 2015

(30) Foreign Application Priority Data

May 23, 2014    (CN) .......................... 2014 1 0220694

(51) Int. Cl.
*F21S 4/00*    (2016.01)
*F21V 23/06*    (2006.01)
(Continued)

(52) U.S. Cl.
CPC ............. *G02B 6/0083* (2013.01); *F21V 23/06* (2013.01); *G02B 6/009* (2013.01); *G02B 6/0068* (2013.01);
(Continued)

(58) Field of Classification Search
CPC .. G02B 6/0068; G02B 6/0083; G02B 6/009; G02F 1/1336; F21S 4/28; F21V 23/003; F21V 23/06
See application file for complete search history.

(56) References Cited

U.S. PATENT DOCUMENTS

| | | | |
|---|---|---|---|
| 7,956,951 B2 * | 6/2011 | Lee ...................... | G02B 6/0073 349/58 |
| 7,976,183 B2 * | 7/2011 | Park .................. | G02F 1/133604 362/221 |

(Continued)

FOREIGN PATENT DOCUMENTS

| | | |
|---|---|---|
| CN | 101737684 A | 6/2010 |
| CN | 102088818 A | 6/2011 |

(Continued)

OTHER PUBLICATIONS

First Office Action dated Nov. 25, 2015 corresponding to Chinese application No. 201410220694.X.

(Continued)

*Primary Examiner* — Alan Cariaso
(74) *Attorney, Agent, or Firm* — Nath, Goldberg & Meyer; Joshua B. Goldberg; Leonid D. Thenor

(57) ABSTRACT

The present invention provides a light bar, a backlight and a display device, the light bar comprises light emitters, a substrate and a connector. Both the light emitters and the connector are provided on the substrate, and the connector comprises an input port configured to be connected to a driving circuit and an output port connected to the light emitters, wherein a through hole penetrating through the substrate in a thickness direction of the substrate is provided in the substrate, and the connector is inserted into the through hole, so that a first end of the connector protrudes from a first side of the substrate while a second end thereof protrudes from a second side of the substrate opposite to the first side. The present invention can reduce the occurrence of dark region and improve the display effect of a display device.

17 Claims, 1 Drawing Sheet

(51) Int. Cl.
*F21V 8/00* (2006.01)
*G02F 1/1335* (2006.01)
*F21V 23/00* (2015.01)

(52) U.S. Cl.
CPC ....... *G02F 1/1336* (2013.01); *G02F 1/133615* (2013.01); *F21S 4/28* (2016.01); *F21V 23/003* (2013.01); *G02F 2001/133612* (2013.01)

(56) References Cited

U.S. PATENT DOCUMENTS

| | | | | |
|---|---|---|---|---|
| 8,212,961 | B2* | 7/2012 | Kim | G02F 1/133308 |
| | | | | 349/58 |
| 8,358,387 | B2* | 1/2013 | Choi | G02B 6/009 |
| | | | | 349/150 |
| 9,052,430 | B2* | 6/2015 | Urano | G02B 6/0068 |
| 2011/0128468 | A1* | 6/2011 | Koganezawa | G02B 6/0083 |
| | | | | 349/61 |

FOREIGN PATENT DOCUMENTS

| | | |
|---|---|---|
| CN | 102095117 A | 6/2011 |
| CN | 102313202 A | 1/2012 |
| CN | 102518975 A | 6/2012 |
| CN | 102734699 A | 10/2012 |
| CN | 202691742 U | 1/2013 |
| JP | 2014095792 A | 5/2014 |
| TW | 201222989 A | 6/2012 |

OTHER PUBLICATIONS

Office Action for CN201410220694.X dated Jun. 6, 2016, and English translation thereof.

* cited by examiner

LIGHT BAR, BACKLIGHT AND DISPLAY DEVICE

FIELD OF THE INVENTION

The present invention relates to the field of liquid crystal display technology, and particularly relates to a light bar, a backlight comprising the light bar and a display device comprising the backlight.

BACKGROUND OF THE INVENTION

When a liquid crystal device displays an image, a backlight is required to provide light for a display panel so as to display the image. According to light incident mode, backlights may be categorized into direct type backlights and side type backlights. A structure of a side type backlight is as shown in FIG. 1. In the side type backlight, a light bar is disposed at a side of a light guide plate 1, so that the liquid crystal display device may have a smaller thickness. The specific structure of the light bar is as shown in FIG. 2, in which a plurality of light emitters 2 are disposed on a substrate 3, and a connector 4 used for connecting a driving circuit is disposed at one end of the substrate 3. The thickness of the connector 4 is usually greater than that of each of the light emitters 2. In this case, in order to improve the light guiding effect of the light guide plate 1, a notch 5 may be provided at a position on the light guide plate 1 corresponding to the connector 4, so that the connector 4 extends towards the notch 5, thereby reducing the distance from each of the light emitters 2 to the light guide plate 1. However, due to this arrangement manner, light emitted from the light emitters 2 may be transmitted to the notch 5 after repeatedly reflected in the light guide plate 1, and therefore, a dark region may be formed at a position of the display panel corresponding to the notch 5. As the frame of the liquid crystal display device becomes narrower, the phenomenon of forming the dark region becomes more obvious, thereby affecting the display effect.

Therefore, how to reduce the occurrence of a dark region on a display panel due to the above arrangement manner has become a technical problem to be solved urgently in the art.

SUMMARY OF THE INVENTION

An object of the present invention is to provide a light bar, a backlight including the light bar and a display device including the backlight, so as to reduce the occurrence of a dark region during the display of a display device.

According to an aspect of the present invention, there is provided a light bar, including light emitters, a substrate and a connector, wherein the light emitters and the connector are provided on the substrate, the connector comprises an input port configured to be connected to a driving circuit and an output port connected to the light emitters, a through hole penetrating through the substrate in a thickness direction of the substrate is provided in the substrate, the connector is inserted into the through hole so that a first end of the connector protrudes from a first side of the substrate while a second end thereof protrudes from a second side of the substrate opposite to the first side.

Preferably, a height of a portion of the connector, on the same side as the light emitters, protruding from the substrate is not greater than a height of each of the light emitters protruding from the substrate.

Preferably, a weld leg is provided on the connector, a bonding pad corresponding to the weld leg is provided on the substrate, and the weld leg is welded with the bonding pad so that the connector is fixedly connected to the substrate.

Preferably, the input port and the output port are arranged at an end of the connector on the same side as the light emitters.

Preferably, the height of the portion of the connector, on the same side as the light emitters, protruding from the substrate is 0.8~1.1 mm.

According to another aspect of the present invention, there is provided a backlight, including a light bar and a driving circuit for providing a driving signal for the light bar, wherein the light bar is the above light bar provided by the present invention, and an input port of the connector of the light bar is connected to the driving circuit.

Preferably, the backlight further includes a light guide plate, the light bar is provided at a side of the light guide plate, and portions of the light guide plate corresponding to the light emitters are aligned with a portion of the light guide plate corresponding to the connector.

Preferably, the backlight further includes a back plate, the light bar is provided on the back plate, a groove is provided at a position of the back plate corresponding to the connector, a first end of the connector extends towards the light guide plate, and a second end thereof is located in the groove.

According to another aspect of the present invention, there is provided a display device, including a backlight, wherein the backlight is the above backlight provided by the present invention.

In the present invention, a through hole is provided on the substrate of the light bar and the connector is disposed in the through hole, so that the a first end of the connector protrudes from a first side of the substrate and a second end thereof protrudes from a second side of the substrate opposite to the first side; meanwhile, the height of a portion of the connector, on the same side as the light emitters, protruding from the substrate is not greater than the height of each of the light emitters protruding from the substrate. Therefore, in a backlight using the light bar, the arrangement of the connector has a small influence on the light guide plate, and it is unnecessary to provide a notch at a position of the light guide plate corresponding to the connector, so that light emitted from the light emitters may be uniformly transmitted in the light guide plate, thereby reducing the occurrence of a dark region on the display panel and improving the display effect.

BRIEF DESCRIPTION OF THE DRAWINGS

The accompanying drawings are used for providing further understanding of the present invention, and constitute a part of the description. The accompanying drawings are used for explaining the present invention together with the following specific embodiments, rather than limiting the present invention. In the accompanying drawings.

DETAILED DESCRIPTION OF THE EMBODIMENTS

The specific embodiments of the present invention will be described below in details in conjunction with the accompanying drawings. It should be understood that the specific embodiments described herein are merely used for describing and explaining the present invention, but are not intended to limit the present invention.

Figure 1:
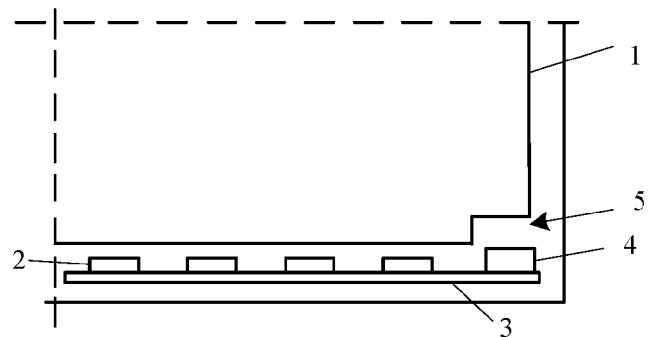
FIG. 1 is a schematic diagram of a structure of an existing backlight.
Figure 2:
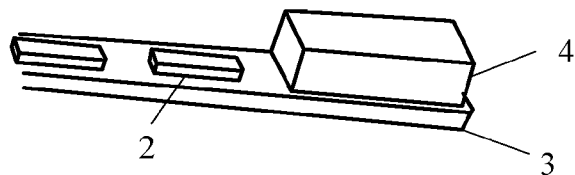
FIG. 2 is a schematic diagram of a structure of an existing light bar.
Figure 3:
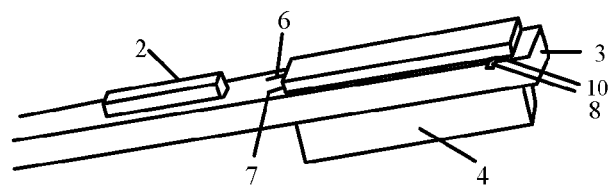
FIG. 3 is a schematic diagram of a structure of a light bar according to the present invention.

As an aspect of the present invention, a light bar is provided. As shown in FIG. 3, the light bar includes light emitters 2, a substrate 3 and a connector 4. The light emitters 2 and the connector 4 are disposed on the substrate 3. The connectors 4 includes an input port 6 configured to be connected to a driving circuit and an output port 7 connected to the light emitters 2. A through hole penetrating through the substrate 3 in a thickness direction of the substrate 3 may be provided in the substrate 3, and the connector 4 is inserted into the through hole, so that a first end of the connector 4 protrudes from a first side of the substrate 3 and a second end thereof protrudes from a second side of the substrate 3 opposite to the first side.

Figure 4:
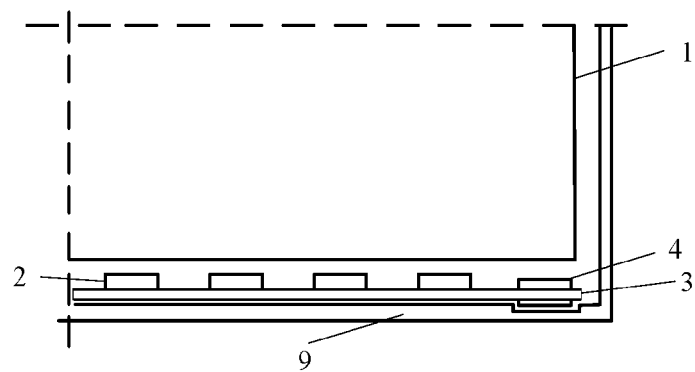
FIG. 4 is a schematic diagram of a structure of a backlight according to the present invention.

The light bar provided by the present invention is particularly applicable to side type backlights. In the present invention, a through hole is provided in the substrate 3 and both ends of the connector 4 protrude from two sides of the substrate 3, respectively, and therefore, compared with the light bar in the prior art, the height of a portion of the connector 4 protruding from the substrate 3 on the same side as the light emitters 2 is reduced. Thus, in a backlight (as shown in FIG. 4) using the light bar, the size of a notch at a position of the light guide plate 1 corresponding to the connector 4 is reduced or no notch is provided, thereby reducing the occurrence of a dark region on a display panel.

In the present invention, the light emitters 2 may be light-emitting diodes.

Further, the height of the portion of the connector 4, on the same side as the light emitters 2, protruding from the substrate 3 is not greater than the height of each of the light emitters 2 protruding from the substrate 3. Therefore, in a backlight using the light bar, portions of the light guide plate 1 corresponding to the light emitters 2 are aligned with a portion of the light guide plate corresponding to the connector 4, that is, it is unnecessary to provide a notch on the light guide plate 1, thereby avoiding the occurrence of a dark region caused by the notch on a display panel.

The manner in which the connector 4 is arranged in the through hole is not limited in the present invention. For example, the cross-sectional shape of the through hole may be fitted with the cross-sectional shape of the connector 4, so that the connector 4 is tightly clamped in the through hole.

In order to avoid the relative movement of the connector 4 in the through hole, preferably, as shown in FIG. 3, a weld leg 8 may be provided on the connector 4, a bonding pad 10 corresponding to the we leg 8 may be provided on the substrate 3, and the weld leg 8 is welded with the bonding pad 10, so that the connector 4 and the substrate 3 are fixedly connected. A plurality of weld legs 8 with the same height may be provided on a side surface of the connector 4, and correspondingly, a plurality of bonding pads 10 corresponding to the weld legs 8 may be provided on an edge of the through hole, thereby improving welding stability.

Further, the input port 6 and the output port 7 may be provided at an end of the connector 4 which is on the same side as the light emitters 2. Correspondingly, a driving signal output end is provided on a driving circuit for providing a driving signal for the light bar, and a conductive circuit is provided on the substrate 3. The input port 6 may be connected to the driving signal output end of the driving circuit, and the output port 7 may be connected to the conductive circuit on the substrate 3, so that the driving signal of the driving circuit may be transmitted to the conductive circuit on the substrate 3 via the connector 4, so as to drive the light emitters 2 to emit light. It should be noted that, in practical production, both the input port 6 and the output port 7 of the connector 4 may include a plurality of pins or electrodes, and there is merely a schematic illustration in the figure.

Further, the height of the portion of the connector 4, on the same side as the light emitters 2, protruding from the substrate 3 is 0.8~1.1 mm. It should be understood that, for different connectors 4, the heights of portions of the connectors, on the same side as the light emitters 2, protruding from the substrate 3 may be different, as long as the protrusion heights are within 0.8~1.1 mm so that the height of a portion of each connector 4, on the same side as the light emitters 2, protruding from the substrate 3 is not greater than the height of each of the light emitters 2 protruding from the substrate 3.

It can be seen from the above description of the light bar provided by the present invention that, a through hole is provided on the substrate of the light bar and the connector is set to be inserted into the through hole, so that both ends of the connector extend to the exterior of the through hole along opposite directions, respectively; meanwhile, the height of a portion of the connector, on the same side as the light emitters, protruding from the substrate is not greater than the height of each of the light emitters protruding from the substrate. Therefore, in a backlight using the light bar, the arrangement of the connector has a small influence on the light guide plate, and it is unnecessary to provide a notch at a position of the light guide plate corresponding to the connector, so that light emitted from the light emitters may be uniformly transmitted in the light guide plate, thereby reducing the occurrence of a dark region on the display panel and improving the display effect.

As another aspect of the present invention, a backlight is provided, the backlight includes a light bar and a driving circuit for providing a driving signal for the light bar. The light bar is the above light bar provided by the present invention, and an input port 6 of the connector 4 of the light bar is connected to the driving circuit.

The backlight may be a side type backlight. Further, as shown in FIG. 4, the backlight further includes a light guide plate 1, the light bar is provided at a side of the light guide plate, and portions of the light guide plate 1 corresponding to the light emitters 2 are aligned with a portion of the light guide plate 1 corresponding to the connector 4. In other words, no notch is provided at a position on the light guide plate 1 corresponding to the connector 4. Therefore, light emitted from the light emitters 2 may be uniformly transmitted in the light guide plate 1, so that the occurrence of a dark region on a display panel is avoided and the distance between the light guide plate 1 and each of the light emitters 2 may not be influenced, thereby improving the display effect.

Further, the backlight further includes a back plate 9. The light bar is provided on the back plate 9. A groove is provided at a position of the back plate 9 corresponding to the connector 4. The first end of the connector 4 extends towards the light guide plate 1, while the second end of the connector 4 is located in the groove, which facilitates fixing the light bar on the back plate 9. Specifically, the depth of the groove may be consistent with the height of the second end of the connector 4 protruding from the surface of the substrate 3, so as to realize the close fit of the connector 4 with the back plate 9. The manner in which the connector 4 and the back plate 9 are fitted may be adhesion realized by an adhesive material.

As still another aspect of the present invention, there is provided a display device, including a backlight, wherein the backlight is the above backlight provided by the present invention.

It should be understood that, the above embodiments are merely exemplary embodiments for illustrating the principle of the present invention; however, the present invention is not limited thereto. Various variations and improvements can be made by a person skilled in the art without departing from the spirit and essence of the present invention, and these variations and improvements should also be considered to be within the protection scope of the present invention.

The invention claimed is:

1. A light bar, comprising light emitters, a substrate and a connector, wherein the light emitters and the connector are provided on the substrate, the connector comprises an input port configured to be connected to a driving circuit and an output port connected to the light emitters, a through hole penetrating through the substrate in a thickness direction of the substrate is provided in the substrate, the connector is inserted into the through hole so that a first end of the connector protrudes from a first side of the substrate and a second end of the connector protrudes from a second side of the substrate opposite to the first side, wherein the input port and the output port are arranged at an end of the connector which is on the same side as the light emitters.

2. The light bar according to claim 1, wherein a height of a portion of the connector, on the same side as the light emitters, protruding from the substrate is not greater than a height of each of the light emitters protruding from the substrate.

3. The light bar according to claim 2, wherein the height of the portion of the connector, on the same side as the light emitters, protruding from the substrate is 0.8~1.1 mm.

4. The light bar according to claim 1, wherein a weld leg is provided on the connector, a bonding pad corresponding to the weld leg is provided on the substrate, and the weld leg is welded with the bonding pad so that the connector is fixedly connected to the substrate.

5. The light bar according to claim 1, wherein a height of a portion of the connector, on the same side as the light emitters, protruding from the substrate is 0.8~1.1 mm.

6. A backlight, comprising a light bar and a driving circuit for providing a driving signal for the light bar, wherein the light bar is the light bar according to claim 1, and the input port of the connector of the light bar is connected to the driving circuit.

7. The backlight according to claim 6, wherein a height of a portion of the connector of the light bar, on the same side as the light emitters of the light bar, protruding from the substrate of the light bar is not greater than a height of each of the light emitters protruding from the substrate.

8. The backlight according to claim 6, wherein a weld leg is provided on the connector, a bonding pad corresponding to the weld leg is provided on the substrate of the light bar, and the weld leg is welded with the bonding pad so that the connector is fixedly connected to the substrate.

9. The backlight according to claim 6, wherein a height of a portion of the connector, on the same side as the light emitters of the light bar, protruding from the substrate of the light bar is 0.8~1.1 mm.

10. The backlight according to claim 6, wherein the backlight further comprises a light guide plate, the light bar is provided at a side of the light guide plate, and portions of the light guide plate corresponding to the light emitters are aligned with a portion of the light guide plate corresponding to the connector.

11. The backlight according to claim 6, wherein the backlight further comprises a back plate, the light bar is provided on the back plate, a groove is provided at a position of the back plate corresponding to the connector, the first end of the connector extends towards the light guide plate and the second end of the connector is located in the groove.

12. A display device, comprising a backlight, wherein the backlight is the backlight according to claim 6.

13. The display device according to claim 12, wherein a height of a portion of the connector of the light bar, on the same side as the light emitters of the light bar, protruding from the substrate of the light bar is not greater than a height of each of the light emitters protruding from the substrate.

14. The display device according to claim 12, wherein the backlight further comprises a light guide plate, the light bar is provided at a side of the light guide plate, and portions of the light guide plate corresponding to the light emitters are aligned with a portion of the light guide plate corresponding to the connector.

15. The display device according to claim 12, wherein the backlight further comprises a back plate, the light bar is provided on the back plate, a groove is provided at a position of the back plate corresponding to the connector, the first end of the connector extends towards the light guide plate and the second end of the connector is located in the groove.

16. The display device according to claim 12, wherein a weld leg is provided on the connector of the light bar, a bonding pad corresponding to the weld leg is provided on the substrate of the light bar, and the weld leg is welded with the bonding pad so that the connector is fixedly connected to the substrate.

17. The display device according to claim 12, wherein a height of a portion of the connector of the light bar, on the same side as the light emitters of the light bar, protruding from the substrate of the light bar is 0.8~1.1 mm.

* * * * *